(12) United States Patent
Ma et al.

(10) Patent No.: US 10,573,874 B2
(45) Date of Patent: Feb. 25, 2020

(54) METHOD OF MANUFACTURING ELECTRONICAL CONNECTION MEANS

(71) Applicant: DAE SAN ELECTRONICS CO., LTD., Gyeonggi-do (KR)

(72) Inventors: Sang young Ma, Gyeonggi-do (KR); Un Eog Yeo, Gyeonggi-do (KR)

(73) Assignee: DAE SAN ELECTRONICS CO., LTD., Gyeonggi-Do (KR)

( * ) Notice: Subject to any disclaimer, the term of this patent is extended or adjusted under 35 U.S.C. 154(b) by 48 days.

(21) Appl. No.: 15/242,710

(22) Filed: Aug. 22, 2016

(65) Prior Publication Data

US 2017/0054132 A1    Feb. 23, 2017

(30) Foreign Application Priority Data

Aug. 21, 2015    (KR) .......................... 10-2015-0118195

(51) Int. Cl.
*H01M 2/30*    (2006.01)
*C25D 5/02*    (2006.01)
(Continued)

(52) U.S. Cl.
CPC ............ *H01M 2/305* (2013.01); *C25D 5/022* (2013.01); *C25D 7/00* (2013.01); *H01M 2/206* (2013.01); *H01M 2220/20* (2013.01)

(58) Field of Classification Search
CPC ........ H01M 2/305; H01M 2/206; H01M 2/30; H01M 2220/20; C25D 7/00; C25D 5/022
See application file for complete search history.

(56) References Cited

U.S. PATENT DOCUMENTS 9,318,815 B2     4/2016  Mitose et al.
2011/0081568 A1*  4/2011  Kim ...................... H01M 2/206
                                                              429/158
(Continued)

FOREIGN PATENT DOCUMENTS

EP    2650972 A1    10/2013
JP    59-126784 A    7/1984
(Continued)

OTHER PUBLICATIONS

European Search Report for EP16185155.5 from European patent office in a counterpart European patent application.
(Continued)

*Primary Examiner* — Louis J Rufo
(74) *Attorney, Agent, or Firm* — The PL Law Group, PLLC

(57) ABSTRACT

A bus bar for a battery of an electric vehicle and a method of manufacturing the bus bar are disclosed. Specifically, in the bus bar for a battery of an electric vehicle according to exemplary embodiments, a method of manufacturing an electrical connector including a plurality of battery terminal connection parts each having a through hole therein includes forming a plurality of the battery connection parts at a metal plate by removing the through hole part and a predetermined part positioned outer side of the battery terminal connection part, applying masking onto a remaining area except the battery connection part and the predetermined part, performing plating on the battery connection part, and forming remaining parts except the plurality of battery connection parts in the bus bar.

16 Claims, 5 Drawing Sheets

(51) Int. Cl.
C25D 7/00 (2006.01)
H01M 2/20 (2006.01)

(56) References Cited

U.S. PATENT DOCUMENTS

| | | | | | |
|---|---|---|---|---|---|
| 2014/0099543 | A1* | 4/2014 | Oda | ............... | H01M 2/30 |
| | | | | | 429/211 |
| 2014/0134471 | A1* | 5/2014 | Frutschy | ............... | H01M 2/202 |
| | | | | | 429/121 |

FOREIGN PATENT DOCUMENTS

| | | | | |
|---|---|---|---|---|
| JP | 2011-228217 A | | | 11/2011 |
| JP | 2012169215 A | | * | 9/2012 |
| JP | 2014-86246 A | | | 5/2014 |
| JP | 2014-143159 A | | | 8/2014 |
| KR | 10-0737973 B1 | | | 7/2007 |
| KR | 10-2014-0146232 A | | | 12/2014 |
| KR | 10-2015-0003864 A | | | 1/2015 |
| WO | WO 2014/024448 A1 | | | 2/2014 |

OTHER PUBLICATIONS

Office action dated Dec. 14, 2015 from Korean Patent Office in a counterpart Korean Patent Application No. 10-2015-0118195.
Notice of Allowance dated Apr. 29, 2016 from Korean Patent Office in a counterpart Korean Patent Application No. 10-2015-0118195.

* cited by examiner

METHOD OF MANUFACTURING ELECTRONICAL CONNECTION MEANS

CROSS-REFERENCE TO RELATED APPLICATION

This application claims priority to and the benefit of Korean Patent Application No. 10-2015-0118195, filed on Aug. 21, 2015, the disclosure of which is incorporated herein by reference in its entirety.

BACKGROUND

1. Technical Field

The present invention relates to a method of manufacturing an electrical connector.

2. Description of Related Art

Generally, a bus bar is used for transmission of electricity in an electric vehicle. A bus bar is a conductor having low impedance and a high current capacity, and can individually connect two or more circuits or connect several like points in a system. A bus bar is generally and frequently used as a common conductor which distributes power to several points. Plating is generally performed on a connecting part in such a bus bar to enhance electrical characteristics. In a conventional method of manufacturing a bus bar, a shape of a bus bar is first formed using a press process or the like, and rack plating and cleaning processes are then performed on a connecting terminal of the bus bar to complete the manufacturing. The rack plating process refers to a method of plating a bus bar that is hung on a rack. In this case, the manufacturing process is inconvenient, and continuity of a manufacturing process is hard to achieve because plating is separately performed by hanging the bus bar on a rack after a process of manufacturing the bus bar of a desired shape.

To resolve the above problem, a method is used for manufacturing a bus bar of a desired shape after plating is performed on a metal plate itself in advance for manufacturing the bus bar. However, in this case, since a connecting part is cut off after being plated and the cut off surface is not plated, electrical properties are degraded because the surface in contact with a battery electrode or the like is not actually plated.

SUMMARY

The present invention is directed to providing a method of manufacturing an electrical connector capable of mass production by minimizing inconvenience of going through multiple processes and reducing manufacturing time of the electrical connector during manufacturing of an electrical connector.

In addition, the present invention is directed to providing a method of manufacturing an electrical connector in which a uniform plating layer is formed on an inner side surface of a terminal connection part through which a battery electrode passes.

According to an aspect of the present invention, there is provided a method of manufacturing an electrical connector including at least one battery terminal connection part having a through hole therein, which includes performing a first process on a metal plate to form the at least one battery terminal connection part which is a target to be plated, performing masking on an area except the battery terminal connection part, performing plating on the battery terminal connection part, and performing a second process to form a remaining part except the at least one battery terminal connection part in the electrical connector.

A cut-off surface of the through hole may also be plated during the performing of the plating on the battery terminal connection part.

The first process may be performed by removing the through hole part and a predetermined part positioned at outer side of the battery terminal connection part.

The electrical connector may include a bus bar.

The bus bar may be used in an electric vehicle.

The at least one battery terminal connection part may be two in number.

A cut-off surface of the through hole may be connected to an outer side of a terminal of the battery.

A perimeter of the predetermined area may be formed with straight lines, curves, and a combination of straight lines and curves.

The masking may be performed using a mask in which the battery connection part and the predetermined part are removed.

The masking may be performed by putting tape on an area except the battery connection part and the predetermined part.

The plating may be performed using at least one metal among nickel (Ni), gold (Au), copper (Cu), and tin (Sn).

The performing of the first process and the second process may include a press process.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
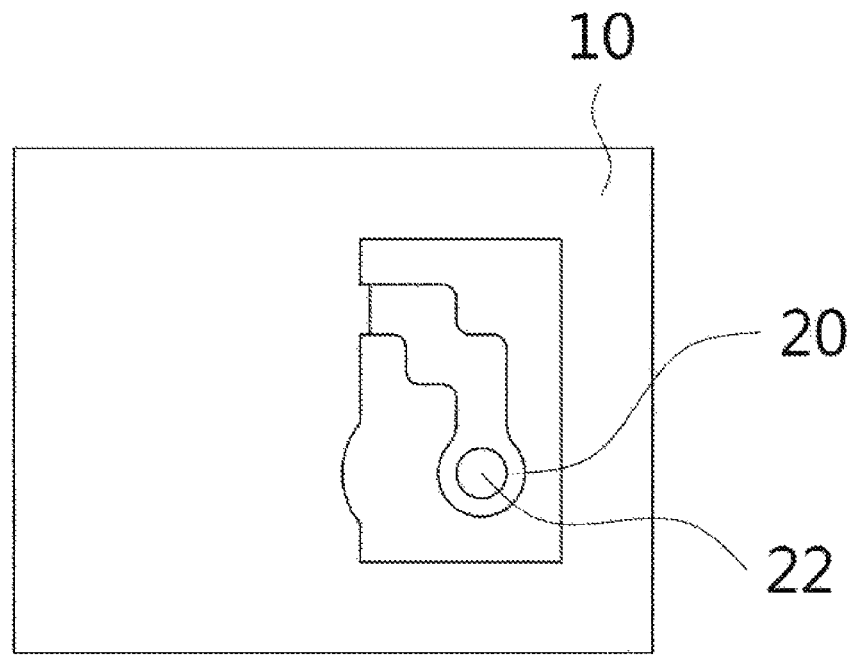
FIG. 1 is a view illustrating a shape of a first terminal connection part on a metal plate according to one embodiment of the present invention.

Hereinafter, a method of manufacturing an electrical connector will be described in detail according to exemplary embodiments of the present invention with reference to FIGS. 1 to 5. However, the embodiments should be considered in a descriptive sense only, and the present invention is not limited to the embodiments set forth herein.

In the description, detailed descriptions of well-known technologies related to the present invention will be omitted where they may unnecessarily obscure the subject matters of the invention. In addition, terms described below are defined considering functions of the present invention, but the terms may be changed by intention or practice of users and operators. Thus, definitions of these terms have to be made on the basis of the content throughout the specification.

Inventive concept of the present invention shall be determined only according to the technical sprit of the attached claims, and the embodiments below are provided only to efficiently convey the advanced concept of the present invention to those skilled in the art.

Meanwhile, the directional terms "upper side," "lower side," "one side" and the like are used in relation to directions in the drawings disclosed. Since elements in the embodiments of the present invention may be set in various directions, the directional terms are used in a descriptive sense only and not for the purpose of limitation.

Although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments.

Figure 2:
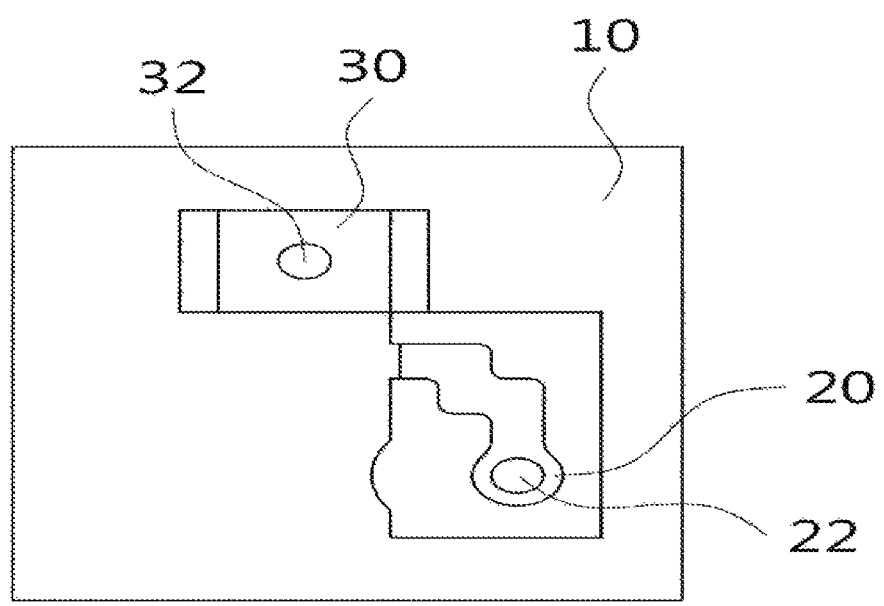
FIG. 2 is a view illustrating shapes of a first terminal connection part and a second terminal connection part on a metal plate according to one embodiment of the present invention.

FIG. 1 is a view illustrating a shape of a first battery terminal connection part formed on a metal plate 10 according to one embodiment of the present invention, and FIG. 2 is a view illustrating shapes of a first battery terminal connection part and a second battery terminal connection part formed on a metal plate according to one embodiment of the present invention. Hereinafter for convenience, the first and second battery terminal connection parts will be respectively described as a first terminal connection part 20 and a second terminal connection part 30.

Figure 4:
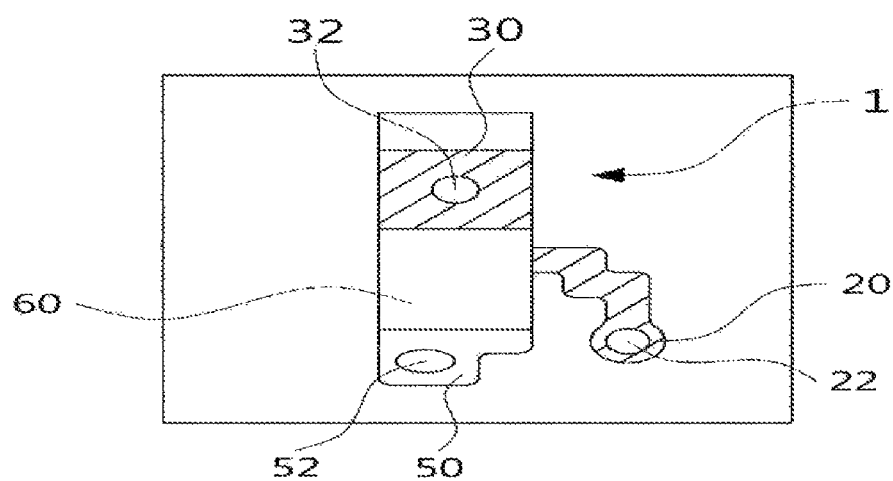
FIG. 4 is a view illustrating a shape of a bus bar according to one embodiment of the present invention.

Referring to FIG. 2 or FIG. 4, a bus bar 1 may include the first terminal connection part 20, the second terminal connection part 30, a fixing part 50, and a terminal main body 60. When manufacturing the bus bar 1, the metal plate 10 may be formed of aluminum and an aluminum alloy or copper and a copper alloy. FIG. 1 is a view illustrating a shape of the first terminal connection part 20 primarily formed on the metal plate 10. Here, a first press process may be employed to form the first terminal connection part 20. An outer shape of the battery terminal connection part including the first terminal connection part 20 may be formed by press processing, and at least one through hole connected to an outer side of a battery may be formed in the first terminal connection part 20. A process of making a first through hole 22 passing through the first terminal connection part 20 may also be included in the first press process for manufacturing the outer shape of the first terminal connection part 20. A battery electrode may pass through an inner side surface of the first through hole 22 and may be connected to a battery terminal. The inner side surface of the first through hole 22 may be plated to minimize variation of contact resistance and reduce resistance of the first through hole 22 serving as an electrical contact part. The first terminal connection part 20 may have a circular shape as illustrated in FIG. 1, but the present invention is not limited thereto and may have an elliptical shape, a polygonal shape, a combined shape formed of curves or straight lines, etc. In addition, a position of the first terminal connection part 20 is not limited to the example illustrated in FIG. 1. The first press process for the first terminal connection part 20 may include a predetermined area positioned at an outer side thereof. A perimeter of the predetermined area may include at least one straight line. By forming the predetermined area, a plating layer for an outer side of the first terminal connection part 20 or the inner side surface of the first through hole 22 formed in the first terminal connection part 20 may easily be formed.

FIG. 2 is a view illustrating a shape of the second terminal connection part 30 above the first terminal connection part 20 on the metal plate 10. Here, the press process may be employed to form an outer shape of the second terminal connection part 30 when performing the first press process. An outer shape of a battery terminal connection part including the second terminal connection part 30 may be formed by press processing, and at least one through hole connected to an outer side of a battery may be formed in the second terminal connection part 30. A process of making a second through hole 32 may be included in the press process for manufacturing the outer shape of the second terminal connection part 30. A battery electrode may pass through an inner side surface of the second through hole 32 and may be connected to a battery terminal. The inner side surface of the through hole may be plated to minimize variation of contact resistance and reduce resistance of the second through hole 32 serving as an electrical contact part. The second terminal connection part 30 may have a rectangular shape as illustrated in FIG. 2, but the present invention is not limited thereto and may have an elliptical shape, a polygonal shape, curves or straight lines, a combination of curves and straight lines, etc. In addition, a position of the second terminal connection part 30 is not limited to an example illustrated in FIG. 2. A predetermined area positioned at an outer side of the second terminal connection part 30 may be included during performing the first press process. The perimeter of the predetermined area may include at least one straight line. By forming the predetermined area, a plating layer for an outer side of the second terminal connection part 30 and the inner side surface of the second through hole 32 formed in the second terminal connection part 30 may easily be formed.

Figure 3:
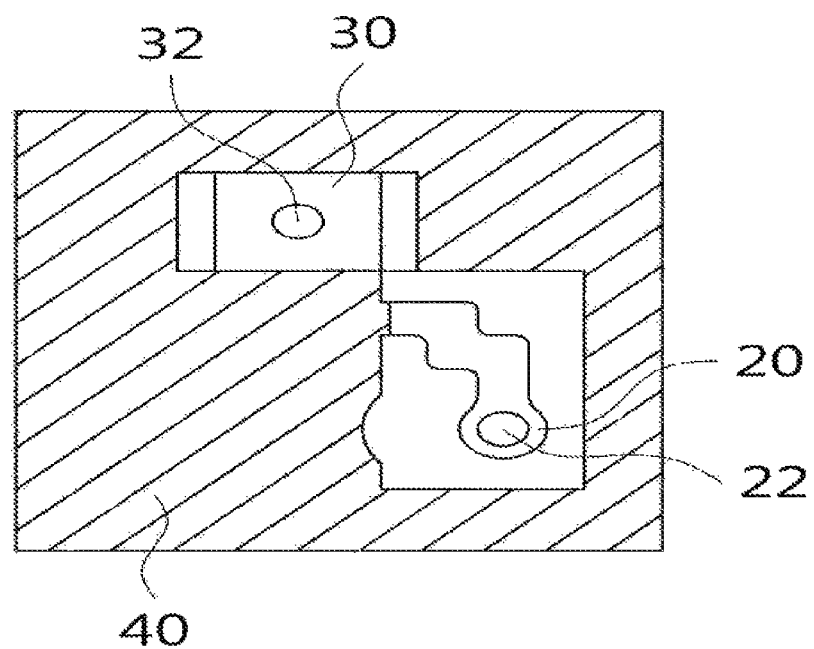
FIG. 3 is a view in which a mask for plating is applied onto a remaining area except a battery connection part and a predetermined area according to one embodiment of the present invention.
Figure 6:
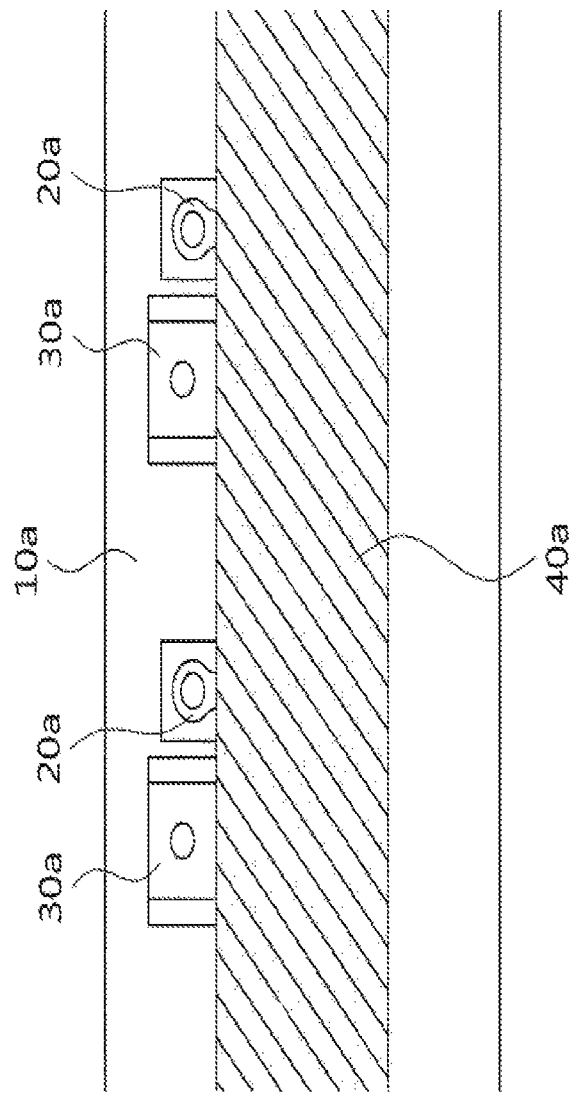
FIG. 6 is a view in which tape is put on a remaining area except a battery connection part and a predetermined area according to one embodiment of the present invention.

Referring to FIGS. 3 and 6, the first terminal connection part 20 and the second terminal connection part 30 which will be connected to a battery terminal may be plated and thermally processed after performing the first press process. For performing the plating process and the thermal process, a masking process may be performed beforehand. For the masking, a mask 40 for plating may be applied onto a remaining area except the first terminal connection part 20, the second terminal connection part 30, and the predetermined areas. The mask 40 may also be applied onto the opposite surface of the metal plate 10. The masking process, which is performed before performing the plating and the thermal processes, for the plating and the thermal processes may be performed in a method of putting on tape 40a rather than using the mask 40.

FIG. 6 is a view illustrating a masking process according to another embodiment of the present invention. FIG. 6 illustrates a form of putting tape on a remaining area except a battery connection part and a predetermined area. A first terminal connection part 20a may be positioned in a direction of one side of a second terminal connection part 30a, and a position of the first terminal connection part 20a may be modified depending on a method of a masking process. Tape 40a for plating the first terminal connection part 20a and the second terminal connection part 30a may be put on a remaining area of a metal plate 10a except the first terminal connection part 20a and the second terminal connection part 30a which are formed in one direction. When the plating is performed using the tape 40a, the tape 40a may be put on the metal plate 10a in the form of a band because the positions of the first terminal connection part 20*a* and the second terminal connection part 30*a* are formed in the same direction.

The plating may be performed using at least one metal among nickel (Ni), gold (Au), copper (Cu), and tin (Sn). The plating may be performed by electroplating, and the mask 40 and the tape 40*a* applied on the metal plate 10 may be removed after performing the plating.

FIG. 4 illustrates a shape of the bus bar 1 that is an electrical connector for a battery of an electric vehicle and has shapes of the first terminal connection part 20 and the second terminal connection part 30 in which the plating layers are completed and on which a second press process is performed. At least one metal among nickel (Ni), gold (Au), copper (Cu), and tin (Sn) may be used to form the plating layers of the first terminal connection part 20 and the second terminal connection part 30. For example, tin plating may be performed after performing nickel plating on the first terminal connection part 20 and the second terminal connection part 30, or the nickel plating may be performed after performing copper plating. A cleaning process may be performed to remove the residual plating solution when the plating process is completed. A second press process may be used to form an outer shape of the bus bar 1 after performing the plating process, and thereby outer shapes of the terminal main body 60 and the fixing part 50 may be formed. A coupling part through hole 52, which may be used to fix a battery of an electric vehicle, may be included in the fixing part 50, and the press process may be performed to make the coupling part through hole 52. By the second press process, the first terminal connection part 20 and the second terminal connection part 30 may be connected by the terminal main body 60, and the fixing part 50 and the coupling part through hole 52 may be formed for fixing the bus bar 1 to an outer side of a battery (not shown). The terminal main body 60 and the first terminal connection part 20 may be connected using at least one shape of a curve, a straight line, or a combination of a curve and a straight line. As illustrated in FIG. 4, the terminal main body 60 may have a rectangular shape. However, the present invention is not limited thereto, and the shape of the terminal main body 60 may include a circular or polygonal shape. The fixing part 50 for fixing the bus bar 1 to an outer side of a battery (not shown) may be formed at a lower side of the bus bar 1. The terminal main body 60 and the fixing part 50 may be connected using at least one shape of a curve, a straight line, or a combination of a curve and a straight line.

Figure 5:
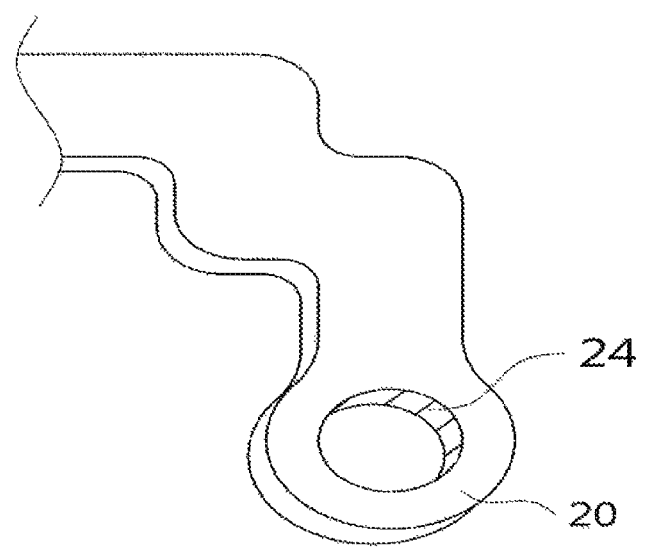
FIG. 5 is a view illustrating a terminal connection part of which an inner side surface of a through hole is plated according to one embodiment of the present invention.

FIG. 5 is a view in which a through hole plating layer 24 is formed at an inner side surface of the first through hole 22. The first through hole 22 may be connected to an outer side of a battery (not shown) via an electrical connection.

Figure 7:
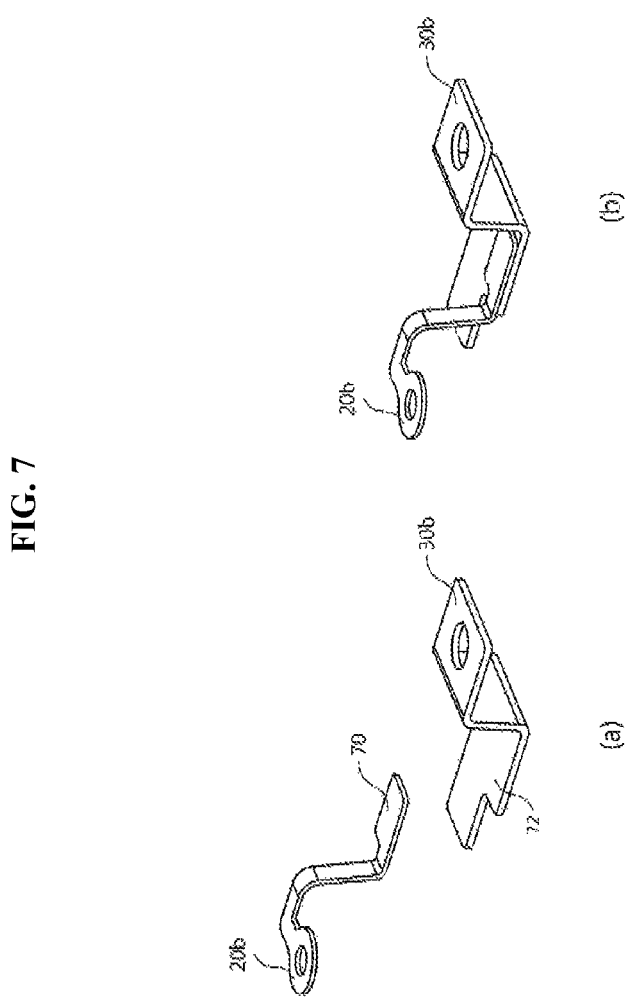
FIG. 7 is a view illustrating a shape of a bus bar according to another embodiment of the present invention.

FIG. 7 illustrates a shape of a bus bar 1 according to another embodiment of the present invention. FIG. 7A is a view illustrating outer shapes of a first terminal connection part 20*b* and a second terminal connection part 30*b* formed by a first press process. A press process may be employed to form the outer shapes of the first terminal connection part 20*b* and the second terminal connection part 30*b*. After the first press process, a mask may be attached to an area except the terminal connection parts for plating and thermally processing the first terminal connection part 20*b* and the second terminal connection part 30*b*. The plating may be performed using at least one metal among nickel (Ni), gold (Au), copper (Cu), and tin (Sn). When the plating is completed, each of a first terminal 70 and a second terminal 72 may be formed to couple the first terminal connection part 20*b* and the second terminal connection part 30*b*. A second press process may be performed to form the first terminal 70 and the second terminal 72. The first terminal 70 and the second terminal 72, which are respectively connected to the first terminal connection part 20*b* and the second terminal connection part 30*b*, may be formed with curves, straight lines, or a combination of straight lines and curves. A method of manufacturing the bus bar 1 may be the same as in the embodiment described above. When the plating process is completed, according to another embodiment of the present invention, a coupling process may be performed to couple the first terminal connection part 20*b* and the second terminal connection part 30*b*. For example, the first terminal connection part 20*b* and the second terminal connection part 30*b* may be coupled by an ultrasonic fusing process. To couple the battery terminal parts, the first terminal 70 connected to the first terminal connection part 20*b* may be mounted on the second terminal 72 connected to second terminal connection part 30*b*. The first terminal 70 may be melted by applying an ultrasonic vibration to the first terminal 70 mounted on the second terminal 72, by which a large amount of heat may be instantaneously generated and the first terminal 70 may thus be fused to the second terminal 72. FIG. 7B is a view illustrating a shape in which the first terminal connection part 20*b* and the second terminal connection part 30*b* are fused. Positions of the first terminal connection part 20*b* and the second terminal connection part 30*b* are not limited to the illustration of FIG. 7 and may be modified. Aluminum and an aluminum alloy or copper or a copper alloy may be used as a metal plate of the bus bar 1 manufactured by the ultrasonic fusing process, and the first terminal connection part 20*b* and the second terminal connection part 30*b* of dissimilar metals may be fused as well. For example, aluminum and an aluminum alloy may be used as the first terminal connection part 20*b*, and copper and a copper alloy may be used as the second terminal connection part 30*b* to form the bus bar of dissimilar metals.

The method of manufacturing the bus bar 1 by the ultrasonic fusing process reduces manufacturing time and maintains continuity of the manufacturing process due to instantaneous fusing of the first terminal 70 and the second terminal 72, thereby enabling mass production. Delays in manufacturing are inevitable in the conventional technologies in which the bus bar 1 is plated after processing the shape of the bus bar 1. In addition, when the shape of the bus bar 1 is processed after the metal plate 10 is plated, the plating layer may not be formed at the inner side surface of the through hole serving as an electrical contact part. Accordingly, a significant amount of manufacturing time is required, and productivity in mass production may be significantly lowered.

The present invention relates to the bus bar 1 serving as the electrical connector for a battery of an electric vehicle and a method of manufacturing thereof, and the simplified manufacturing process allows minimized manufacturing time and mass production. In addition, the present invention reduces the problem of a cut off portion of the through hole connected to an outer side of a battery (not shown) not being plated when a metal plate is plated before the press process.

According to the embodiments of the present invention, a method of manufacturing the electrical connector is provided, and the method can reduce processing time of manufacturing the electrical connector by manufacturing the battery terminal connection part at a metal plate in a desired shape and performing a plating process thereon, thereby enabling mass production of the electrical connector.

In addition, according to the embodiments of the present invention, a method of manufacturing the electrical connector is provided, and the method can enhance electrical properties in the process of manufacturing the shape of the electrical connector by forming a uniform plating layer also at the inner side surface of the through hole in the battery terminal connection part through which a battery electrode passes.

While the present invention has been described in connection with exemplary embodiments, it should be understood to those skilled in the art that various modifications may be made from the embodiments described above without departing from the spirit and scope of the invention. Accordingly, the scope of the present invention is not limited to the embodiments described above, but should be defined according to the attached claims and equivalent scope thereof.

What is claimed is:

1. A method of manufacturing an electrical connector including at least one battery terminal connection part having a through hole therein, the method comprising:
    performing a first process on a metal plate to form the at least one battery terminal connection part which is a target to be plated;
    after performing the first process, performing masking on an area except the at least one battery terminal connection part;
    after performing the masking, performing plating on the battery terminal connection part; and
    after performing the plating, performing a second process to form a remaining part of the electrical connector except the at least one battery terminal connection part, the second process including a press process forming an outer shape of the remaining part,
    wherein a cut-off surface of the through hole is also plated during the performing of the plating on the battery terminal connection part,
    wherein the first process is performed by removing the through hole part and a predetermined area positioned at outer side of the battery terminal connection part on the metal plate,
    wherein a perimeter of the predetermined area includes at least one straight line on the metal plate,
    wherein the masking is performed using a mask or tape applied onto a remaining area except the at least one battery terminal connection part and the predetermined area,
    wherein the mask or the tape applied on the metal plate is removed after performing the plating.

2. The method of claim 1, wherein the electrical connector includes a bus bar.

3. The method of claim 2, wherein the bus bar is used in an electric vehicle.

4. The method of claim 1, wherein the at least one battery terminal connection part is two in number.

5. The method of claim 1, wherein a cut-off surface of the through hole is connected to an outer side of a terminal of the battery.

6. The method of claim 1, wherein a perimeter of the predetermined area is formed with straight lines, curves, and a combination of straight lines and curves.

7. The method of claim 1, wherein the masking is performed using the mask in which the battery connection part and the predetermined part are removed.

8. The method of claim 1, wherein the masking is performed by putting the tape on an area except the battery connection part and the predetermined part.

9. The method of claim 1, wherein the plating is performed using at least one metal among nickel (Ni), gold (Au), copper (Cu), and tin (Sn).

10. The method of claim 1, wherein the performing of the first process includes a press process.

11. A method of manufacturing an electrical connector including a plurality of battery terminal connection parts each having a through hole therein, the method comprising:
    performing a first process to form each battery terminal connection part on each of plates formed of metal material, wherein the metal materials forming the plates are the same or different from each other;
    after performing the first process, performing masking on an area except the battery terminal connection part in each plate;
    after performing the masking, performing plating on each battery terminal connection part;
    after performing the plating, performing a second process on each plate to form a coupling part connected to each battery terminal connection part on each plate at a remaining part except at least one of the battery terminal connection part; and
    after performing the second process, fusing the coupling parts to each other and completing the electrical connector,
    wherein the first process is performed by removing the through hole part and a predetermined part positioned at outer side of the battery terminal connection part of each plate,
    wherein a perimeter of the predetermined area includes at least one straight line on each plate,
    wherein the masking is performed using a mask or tape applied onto a remaining area except the battery terminal connection part and the predetermined area,
    wherein the mask or the tape applied on each plate is removed after performing the plating.

12. The method of claim 11, wherein the fusing includes ultrasonic fusing or welding.

13. The method of claim 11, wherein the plates are formed of the same metal material.

14. The method of claim 11, wherein the plates are formed of dissimilar metal materials.

15. The method of claim 11, wherein each of the plates is formed using at least one among aluminum and an aluminum alloy and copper and a copper alloy.

16. The method of claim 11, wherein the plating further comprises plating a cut-off surface formed by the first process.

* * * * *